UNITED STATES PATENT OFFICE 2,523,005

METHOD OF STABILIZING PHOSPHORS

Herman C. Froelich, Cleveland Heights, Ohio, assignor to General Electric Company, a corporation of New York No Drawing. Original application May 14, 1942, Serial No. 442,993. Divided and this application May 2, 1946, Serial No. 666,776

1 Claim. (Cl. 117—33.5)

This invention relates to fluorescent lamps or tubes and the like, and particularly to methods of improving luminescent materials or phosphors.

This application is a division of my co-pending parent application Serial No. 442,993, filed May 14, 1942, now Patent 2,408,621, granted October 1, 1946, and which is assigned to the assignee of the present application.

The invention is especially concerned with deterioration of phosphors arising from manganese or the like which is used for purposes of activation with matrix materials such as metal silicates and the like, exemplified by cadmium silicate, zinc silicate, or zinc-beryllium silicate. Other matrix materials of this character are metal phosphates, chloro-phosphates, and borates, such as those of cadmium. The invention aims not only to prevent deterioration of phosphors by manganese of their own, but also to obviate deteriorating influence of manganese in one phosphor on an associated phosphor that may not itself contain any manganese. An example of such a phosphor mixture is one of manganese-activated zinc-beryllium silicate with magnesium tungstate without any added activator, which gives a white light when excited by the 2537 Å. resonance radiation of the mercury arc discharge.

I have explained my invention hereinafter with particular reference to the above-mentioned white phosphor mixture and to zinc-beryllium silicate phosphor activated with manganese. Such zinc beryllium silicate phosphor is a material of almost ceramic properties, that has been heated in the air at temperatures of about 1100° to 1300° C. during its preparation. Magnesium tungstate phosphor also undergoes atmospheric heating at fairly high temperature during manufacture, though its properties would scarcely be termed ceramic.

In the manufacture of fluorescent lamps or tubes of the usual positive column discharge type, finely powdered phosphor is intimately mixed with organic binder solution (as of nitrocellulose) by grinding in a ball-mill. After application of the resulting phosphor suspension to a lamp tube and drying out of the binder liquid or solvent, the coated tube undergoes baking for some minutes in an oven to burn out the binder, at an actual wall temperature of some 400° C. to 600° C., more or less. In some cases, as in the bending of fluorescent electric sign tubes, the coated lamp envelopes may be heated as high as 600–625° C., or even 650° C.

In the case of fluorescent lamps coated with the above-mentioned white phosphor mixture, it has been found that exposure to atmospheric temperatures of some 600° C. or more (as in bending coated sign tubes) results in a loss of fluorescent brightness amounting to some 15–30 per cent. As both the components of this phosphor mixture have undergone prolonged atmospheric heating at considerably higher temperatures than this, it was thought that such deterioration of the phosphor mixture must be due to some deactivating reaction between these components when heated together. However, phosphors consisting solely of zinc-beryllium silicate (or other silicates) activated with manganese exhibit similar deterioration. When heated as above mentioned, phosphors consisting in whole or in part of such activated silicate(s) also change in color as observed under white light: their natural pure white takes on light shades of gray or brown. The finer the phosphor, and the greater its exposed surface, the more pronounced is the deterioration by heating; and it is also more pronounced when the phosphor is heated in pure oxygen instead of in air. Even at a temperature of only 500° C. in air, standard zinc beryllium silicate phosphor changes color and loses about 8–10 per cent in brightness.

As there is every reason to believe that silicate phosphors consist of a matrix of the compound represented, for example, by the formula $(Zn,Be)_2SiO_4$, together with manganous oxide, MnO, in solid solution in this matrix, and as such phosphors undergo several hours of heating in air at relatively high temperatures (such as 110° C. to 1300° C.) during manufacture, it is very surprising that such phosphors should not be perfectly stable when heated for a few minutes below red heat, as in lamp tube baking or bending; and yet this is indubitably the case. Furthermore, it has so far proved impossible to prepare manganese activated silicate phosphors of anything like normal fluorescence that do not show the deterioration above described, under heat that is otherwise desirable in lamp processing. By refiring such phosphor after grinding, its stability as against loss of brightness by heating is improved; but it still remains subject to objectionable deterioration.

I have found that the discoloration and loss of fluorescent brightness which silicate phosphors and white phosphor mixtures undergo when heated is due to manganese which is not, apparently, activatingly combined with the silicate phosphor matrix, or included in the crystal lattice of this matrix—in other words, is not even in solid solution in the silicate. In the case of white phosphor mixtures, the magnesium tungstate phosphor is also somewhat affected by such "stray" manganese of the associated silicate phosphor; but the major effect is on the silicate phosphor itself. For both cases, I have found means of obviating such phosphor deterioration.

I have determined that "stray" manganese is commonly present even in silicate phosphor that has not undergone the heating incident to lamp processing, and is manifested in a demonstrable oxidizing power associated with this phosphor, and not to be accounted for by its essential composition as $(Zn,Be)_2SiO_4$ with activating MnO in solid solution therein. A test which shows this oxidizing power is to make a slurry of the phosphor in a weakly acid solution of starch and potassium iodide, which turns blue in response to the oxidizing action of the stray manganese compound present in the phosphor. Titration with very dilute sodium thiosulphate or the like makes the test quantitative. The explanation seems to be that the manganous oxide MnO is not very tightly held in its solid solution in silicate phosphor matrices, and that at some period after the heating of the phosphor in manufacture, some of this MnO readily or normally separates out of solid solution and comes to the surface of the phosphor particles, where it oxidizes to forms in which manganese is of higher valence than 2, and which display the oxidizing power here referred to.

This oxidizing power and the dark discoloration which the phosphor undergoes when heated to some 500–650° C. would indicate a manganese compound in which manganese is more than divalent (as in MnO). Evidence is inconclusive as to whether the compound is $Mn_2O_3$, $Mn_3O_4$, $MnO_2$, manganic silicate, zinc manganate, or other compound, though the discoloration toward brown under heating rather points to some of the many higher manganese oxides. Quantitative determinations show an amount of the compound ranging from about 0.001 to about 0.01 per cent of the zinc-beryllium silicate phosphor by weight, with an average of about 0.006 per cent. Such an infinitesimal amount of material can only be present as spots on the phosphor particles, too minute and scattered to be visually detected in any way; but during the heating of the phosphor, these invisible spots act as nuclei for a build-up of larger amounts of dark compound into larger spots, or themselves aggregate into larger spots, or both. In other words, the initial spots seem to have a catalytic influence toward deterioration by heating. The discoloration and loss of brightness from heating reach their maximum so quickly as to indicate that diffusion during heating is not an important factor: most, at least, of the manganese that is responsible for darkening is near the surface of the phosphor particles before heating.

It is to the minute yet spotty distribution of dark matter that I attribute the light gray or brown discoloration of the phosphor after heating. In the operation of a fluorescent lamp containing this deteriorated phosphor, the spotty coloring presumably acts as a screen or filter for the radiation that is relied on to excite the phosphor, as well as for the resulting fluorescent light, whence in whole or in part the diminished fluorescent brightness.

I have discovered that while it seems impracticable to produce phosphors free from deleterious stray manganese compound, it is feasible to remove or eliminate it in such wise as to obviate its bad catalytic influence. This may be done either before or after the phosphor is applied to the lamp envelope, and may involve either an actual and literal removal; or a conversion of the deleterious compound into something that is inert or innocuous, as by reducing it to a lower form (such as MnO) which does not impair the brightness of the phosphor; or an inactivation of the compound in other ways.

A method of eliminating the deleterious manganese compound by conversion without removal is to reduce this compound to a lower one in which the manganese is divalent merely. This can be effected by heating the phosphor in vacuum to about 500–600° C., or in a reducing atmosphere, as of hydrogen, though this reaction is reversible. For example, lamps coated with silicate phosphor can be baked as usual at 400–600° C., and then filled with hydrogen and heated to about 425° C. for 5 or 10 minutes before being exhausted and charged with mercury and starting gas (e. g., argon at a pressure of 2–4 mm. of mercury), and sealed off.

A method of actually removing the deleterious manganese compound is to treat the phosphor with dilute acid in the presence of a suitable reducer, such as sulphur dioxide, hydrogen peroxide, etc., thus converting higher manganese oxide into a water-soluble manganous salt. All that is necessary is to stir the phosphor into a very dilute acidified solution of the reducer, leave it in suspension a few minutes, then filter off the liquid, wash the phosphor thoroughly, and dry it. Other inorganic reducers that may be used satisfactorily include hydrazine, stannous chloride, hydriodic acid, etc. Organic reducers may also be used, such as mucochloric acid, or many ordinary photographic developing agents, like p-methylaminophenol sulphate, for example. Acids suitable for use with inorganic or organic reducers include both mineral and organic acids, such as sulphuric acid, acetic acid, etc.

To effect complete removal of the deleterious manganese and thus completely stabilize the phosphor against deterioration, an excess of reducer over the theoretical amount is practically required. For sulphur dioxide, this means an excess of the order of some 300 per cent, and even more may be used. The reason for such an excess of $SO_2$ is that part of the $SO_2$ combines with the water present to form the acid $H_2SO_3$ and is used up in dissolving the matrix material before the rest of the $SO_2$ effects the complete reduction of the deleterious manganese compound.

To really remove the deleterious oxide, it must not merely be reduced to MnO, but actually converted into a water-soluble salt, which requires a small amount of free acid in addition to the reducer. This renders the operation somewhat delicate, because silicate phosphors (and particularly zinc-beryllium silicate) are easily soluble in very dilute acid. Even at a concentration as low as 0.001 per cent, free mineral acid will dissolve out the zinc and beryllium in a comparatively short time, leaving only a skeleton of insoluble amorphous silica. Hence very rapid handling and short exposure of the phosphor is required. Acetic acid has the advantage that its dissolving action on the phosphor matrix is milder than that of mineral acids.

It is advisable that before being treated with reducer, the phosphor powder should be made just as fine as it is desired to have it for application to lamps, because grinding it finer after treatment would result in exposing new surfaces with their deleterious manganese compound, so that part of the benefit of treatment would be lost. Indeed, it is observed that after the treated phosphor is ball-milled with binder enough to mix them thoroughly for application to a lamp, this phosphor shows somewhat less improvement in fluorescent brightness on the lamp wall than would be expected from brightness tests made just before and just after the reducer treatment.

For the convenience of those desiring to practice the invention (but not as limiting or defining it), the following illustrative particulars of the preferred wet method are given, the work being carried on with baths or solutions at ordinary room temperature:

To a bath of 200 cc. of distilled water containing 0.03 per cent of acetic acid is added 10 cc. of a 5 per cent aqueous solution of sulphur dioxide ($CO_2$). 100 g. of zinc-beryllium silicate phosphor are suspended in 200 cc. of distilled water, making a thin slurry. The solutions are then poured together and stirred for 5-10 minutes, and the whole is then promptly filtered through ordinary filter paper on a suction filter. The phosphor filter-cake is at once thoroughly washed with distilled water drawn through it on the filter, until the filtrate no longer shows any acid reaction. After drying, the phosphor is ready for incorporation with the binder for application to fluorescent lamp envelopes as usual.

A somewhat more convenient method of treating the phosphor with reducer and dilute acid is to pass moist sulphur dioxide gas through the dry phosphor powder for some minutes in a suitable closed vessel, and afterward to wash the gassed powder with suitably acidulated water on a filter, followed by thorough washing with pure water. However, the wet method described above is at present preferred for phosphors used in ordinary fluorescent lamps.

Manganese-activated silicate phosphor that is treated with reducer such as $SO_2$ and dilute acid according to the preferred wet method hereinbefore described is somewhat whiter than before; shows a gain in fluorescent brightness of as much as 10 per cent when tested directly afterward, or even more, without any apparent shift in color toward yellow or green; gives no reaction to an oxygen test such as that with starch and potassium iodide, which indicates absence of free manganese oxide or the like higher than MnO, both at the surfaces and in the interior of the silicate matrix crystals; remains 100 per cent stable when heated to 500-650° C., either alone or in admixture with magnesium tungstate; and shows satisfactory maintenance of output in fluorescent lamps.

A method of virtually eliminating their stray manganese from phosphors and thus stabilizing them is to inactivate the phosphor against deleterious reaction of the stray manganese developed during heating, as by protectively coating the phosphor particles. For example, the powdered phosphor may be suspended in a 5 per cent solution of boric oxide ($B_2O_3$) in methyl alcohol, which may then be filtered through filter paper on a suction filter, and allowed to dry. In the case of fluorescent lamp phosphors, this general method may be used more advantageously to treat the phosphor after it has been coated on the inside of the lamp envelope. For this purpose, the phosphor-coated lamp envelope may be flushed out with a 1 per cent solution of boric oxide in methyl alcohol, allowed to drain, and then dried, after which the lamp may be processed and completed as usual. The thin film of boric oxide with which the phosphor particles are thus coated and ensealed prevents oxidizing reaction of stray manganese developed during the heating of the lamp in processing it, and thus prevents discoloration of the phosphor and impairment of its fluorescence.

What I claim as new and desire to secure by Letters Patent of the United States is:

A method of improving the brightness of a thermally synthesized luminescent composition of a metal silicate as matrix and divalent manganese as an activator, which method comprises, after application of the composition to the interior surface of an envelope and after heating to a temperature sufficient to burn out a binder for said composition, heating said composition in an atmosphere comprising hydrogen to reduce to divalent form the higher valent superficial and uncombined manganese compounds to stabilize the resultant composition by causing the divalent manganese compounds so reduced to re-enter said matrix in solid solution.

HERMAN C. FROELICH.

REFERENCES CITED

The following references are of record in the file of this patent:

UNITED STATES PATENTS

| Number | Name | Date |
|---|---|---|
| 1,197,616 | Eldridge | Sept. 12, 1916 |
| 2,141,905 | Fonda | Dec. 27, 1938 |
| 2,408,621 | Froelich | Oct. 1, 1946 |

Certificate of Correction

Patent No. 2,523,005                                        September 19, 1950

HERMAN C. FROELICH

It is hereby certified that error appears in the printed specification of the above numbered patent requiring correction as follows:

Column 5, line 20, for "$(CO_2)$" read $(SO_2)$;

and that the said Letters Patent should be read as corrected above, so that the same may conform to the record of the case in the Patent Office.

Signed and sealed this 31st day of July, A. D. 1951.

[SEAL]

ERNEST F. KLINGE,
*Assistant Commissioner of Patents.*